Figure 1:
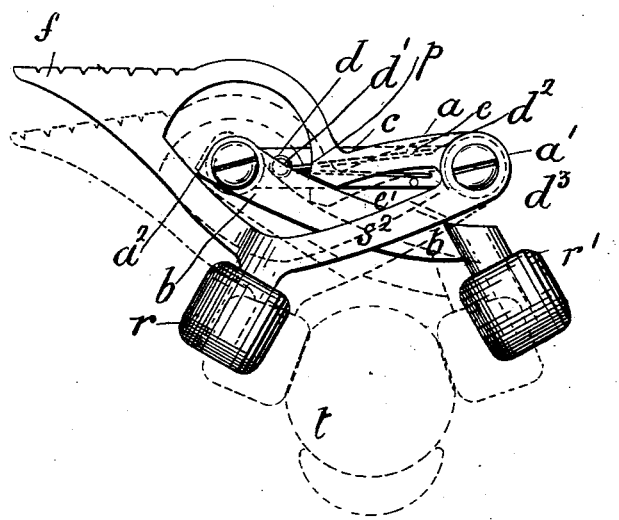

(No Model.) 2 Sheets—Sheet 1.

G. BAXTER.
BRAKE FOR VELOCIPEDES.

No. 564,862. Patented July 28, 1896.

Witnesses,

Inventor,
George Baxter
By James L. Norris
Atty.

(No Model.) 2 Sheets—Sheet 2.

G. BAXTER.
BRAKE FOR VELOCIPEDES.

No. 564,862. Patented July 28, 1896.

Witnesses.
Thos. A. Gunn
Robert Everett

Inventor.
George Baxter.
By James L. Norris
Atty.

UNITED STATES PATENT OFFICE.

GEORGE BAXTER, OF LONDON, ENGLAND, ASSIGNOR TO GRIFFITH GRIFFITH, OF SAME PLACE.

BRAKE FOR VELOCIPEDES.

SPECIFICATION forming part of Letters Patent No. 564,862, dated July 28, 1896.

Application filed April 13, 1896. Serial No. 587,317. (No model.) Patented in England October 5, 1895, No. 18,650.

*To all whom it may concern:*

Be it known that I, GEORGE BAXTER, gentleman, a subject of the Queen of Great Britain, residing at 1 Frederick's Place, Old Jewry, London, England, have invented a new or Improved Brake for Velocipedes and the Like, (for which I have obtained a patent in Great Britain, No. 18,650, bearing date October 5, 1895,) of which the following is a specification.

My invention relates to a new or improved brake for velocipedes and the like, which is more particularly designed for use where pneumatic tires are employed, the object of the present invention being to provide a light and effective brake of simple construction that can be readily attached to a velocipede, the said brake being arranged to be operated by the foot of the rider, while it takes effect upon the sides of the tire instead of on the tread thereof. By this means the tire is not damaged by the action of the brake, which takes effect at the sides of the tire and not at the part designed to come into contact with the ground.

In carrying my invention into practical effect my improved brake consists, essentially, of a suitably-shaped flat frame pivoted at one end to the cross-piece of the connecting clamp or socket, and furnished at about the middle with a projecting pin or spindle carrying a roller of wood, india-rubber, or other suitable material designed to come into contact with the tire, the free end of the said frame taking the form of a projecting arm or foot plate or bar. I likewise provide a second curved arm, passing through a slot formed in one side of the aforementioned frame or over same, the said arm being likewise pivoted at one end to the cross-piece of the connecting socket or clamp and furnished at the other with a projecting pin or spindle carrying a roller of wood, india-rubber, or other suitable material designed to come into contact with the tire. Upon pressure being applied to the foot-plate the aforesaid frame is depressed, bringing the roller carried by it against one side of the tire, while the pivoted arm carrying the second roller is simultaneously depressed by a projecting part of the said frame, which bears upon its edge. The second roller is thus brought closely against the tire, which is tightly gripped between the two rollers, forming a thoroughly reliable and efficient brake. I likewise provide a suitable spring conveniently arranged for bringing the parts back to their normal position out of contact with the tire when the pressure of the foot is removed.

In order to secure the brake to the machine, I furnish the cross-piece to which the frame and curved arm are pivoted with a clamp or socket formed in two parts, each furnished with a semicircular recess, which parts are secured together by means of screws, bolts, or the like, the said socket or clamp being designed to embrace the tubular stem of the front fork of the velocipede where a "double-crown" front fork is employed, or in other cases to embrace the tubular head of the machine.

Although this improved brake has been more particularly described as being arranged to be operated by the foot, it is obvious that by applying a suitable brake-handle and plunger-rod for applying pressure to what I now term the "foot-plate" it can be operated by hand.

In order that my invention may be more fully understood, I will now proceed to describe same with reference to the accompanying drawings, in which like letters of reference indicate corresponding parts, and in which—

Figure 2:
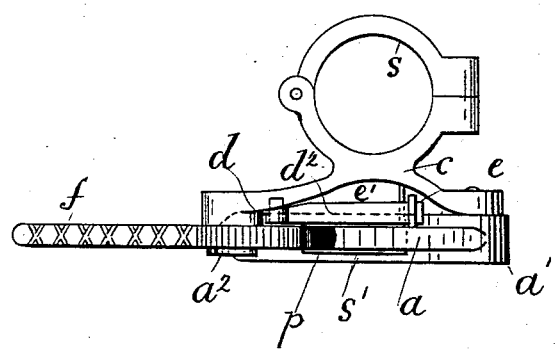

Figure 1 is a front view of my improved brake with the second position of it shown in dotted lines, also a section of a tire. Fig. 2 is a plan of Fig. 1, not showing the brake-rollers; and Fig. 3 shows my improved brake applied to so much of the front fork of a velocipede as is necessary to illustrate this invention, and also showing a slight modification or attachment whereby the brake may be more easily operated.

My improved brake consists, essentially, of a flat frame $a$, pivoted at one end $a'$ to the cross-piece $c$ of the connecting socket or clamp $s$ and furnished with a projecting pin or stud, upon which is mounted a brake-roller $r$, the free end of the frame taking the form of a projecting arm or foot-plate $f$, which may be serrated or roughened upon the upper surface, so as to prevent the foot from slipping. A curved arm $b$ is also provided, which passes through a slot $s'$, formed in the side $s^2$ of the frame $a$, the said arm being pivoted at $a^2$ to the other end of the cross-piece $c$ and furnished with a projecting pin, spindle, or the like carrying the second brake-roller $r'$.

The action of my improved brake is as follows: Upon pressure being applied to the foot-plate $f$, the frame $a$ is depressed, bringing the roller $r$ into contact with the side of the tire $t$, while the pivoted arm $b$ is simultaneously depressed by the inwardly-projecting part $p$ of the frame $a$, so that the tire is gripped between the two rollers $r$ and $r'$. In order to bring the parts back to their normal position when the pressure is removed, I provide a spring $d$, pivoted at $d'$ to the cross-piece $c$, the ends $d^2$ and $d^3$ being confined between two pins $e$ $e'$, the pin $e$ being secured to the frame $a$ and the pin $e$ to the cross-piece $c$. As the frame $a$ is depressed the two ends $d^2$ and $d^3$ are brought closer together by means of the pin $e$, secured to the frame $a$, forcing the upper end $d^2$ down, and upon the pressure being removed the end $d^2$ again raises the frame $a$, the curved arm $b$ being also raised by its resting upon the lower edge of the slot $s'$, formed in the side $s^2$ of the said frame $a$.

Figure 3:
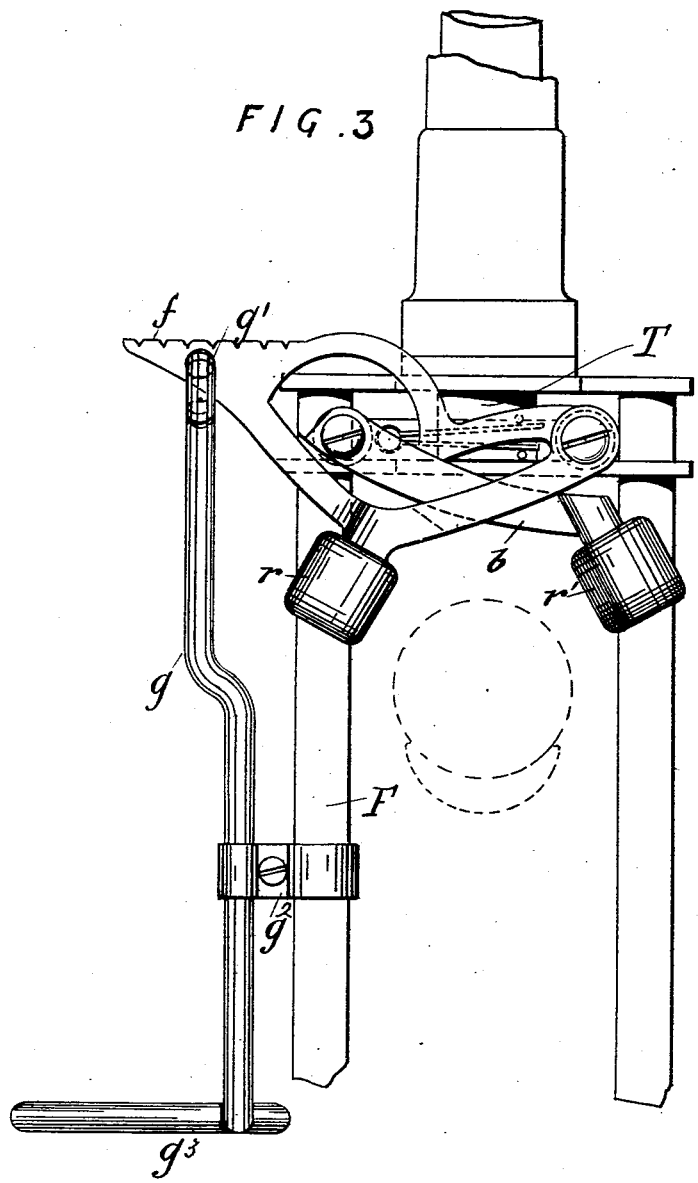

Fig. 3 shows a slight modification of or addition to my improved brake for the purpose of enabling it to be more easily operated and also to render it unnecessary for the foot to be raised to such a height as is required when the pressure is applied directly to the foot-plate $f$. This attachment consists of a rod $g$, one end of which passes through a hole or perforation $g'$, formed in the foot-plate $f$, the said rod projecting downwardly for a sufficient distance and passing through a suitable guide or steadying clamp $g^2$, attached to the fork F, the end of the said rod being then bent into a circular or oval form, so as to provide a suitable resting-place $g^3$ where the pressure may be applied. Instead of the guiding-clamp $g^2$ being employed, the rod $g$ may pass through a suitable hole or perforation formed in one of the foot-rests where they are employed.

In order to attach my improved brake to a velocipede, as shown in the drawings, the socket $s$ is opened and passed around the tube T of the front fork F, where it is tightly secured in position by means of a suitable screw, screw-bolt, or the like.

I claim—

1. In a brake for velocipedes and the like, the combination of a clamp $s$ for attaching the brake to the tube of the front fork; a cross-piece $c$ integral with one portion of the clamp $s$; a frame $a$ furnished with a pedal $f$ and a projection $p$, pivoted at $a'$ to the cross-piece $c$, the frame $a$ being slotted at $s'$, and carrying a roller $r$; an arm $b$ pivoted to the cross-piece $c$ at $a^2$, and passing through the slot $s'$ in the frame $a$, the arm $b$ being fitted with a roller $r'$; a spring $d$ in contact with pins $e$ $e'$, operating so as to open out and release the rollers $r$ and $r'$ from the sides of the pneumatic or other tire, on the removal of the foot from the treadle $f$, substantially as described.

2. In a brake for velocipedes and similar vehicles, the combination with a support having means for attachment to the fork of the vehicle, of two arms respectively pivoted at their upper ends to the opposite ends of said support and provided with rollers adapted to engage the opposite sides of the wheel-tire, a pedal carried by one of said arms for depressing the latter, means for causing said arms to move in unison, and a spring for normally holding said arms elevated to maintain the rollers out of contact with the tire, substantially as described.

3. In a brake for velocipedes and similar vehicles, the combination with a support provided with means for attachment to the fork of the vehicle, of two arms respectively pivoted at their upper ends to the opposite ends of said support and crossing each other and movably connected together intermediate their ends, rollers carried by said arms and operating to engage the opposite sides of the tire, a pedal carried by one of said arms for depressing the latter to cause the rollers to engage the tire, and a spring for normally holding said arms elevated to maintain the rollers out of contact with the tire, substantially as described.

Dated this 31st day of March, 1896.

GEO. BAXTER.

Witnesses:
 WALTER J. S. KERTEN,
 GEO. J. B. FRANKLIN.